US008214143B2

(12) United States Patent
Miyajima et al.

(10) Patent No.: US 8,214,143 B2
(45) Date of Patent: Jul. 3, 2012

(54) NAVIGATION DEVICES, METHODS, AND PROGRAMS

(75) Inventors: Takayuki Miyajima, Anjo (JP); Kazuhide Adachi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 764 days.

(21) Appl. No.: 12/153,575

(22) Filed: May 21, 2008

(65) Prior Publication Data

US 2008/0300783 A1    Dec. 4, 2008

(30) Foreign Application Priority Data

May 31, 2007    (JP) ................................. 2007-146261
Mar. 13, 2008   (JP) ................................. 2008-063700

(51) Int. Cl.
*G06F 17/00* (2006.01)
(52) U.S. Cl. .................. 701/410; 340/995.2; 340/407.1; 340/435; 701/49
(58) Field of Classification Search .................. 701/209, 701/49, 410; 73/504.16; 340/995.2, 995.27, 340/407.1, 435; 180/444, 446; *G06F 17/00*
See application file for complete search history.

(56) References Cited

U.S. PATENT DOCUMENTS

| | | | | |
|---|---|---|---|---|
| 5,707,109 A * | 1/1998 | Massara et al. | ............ | 297/284.9 |
| 5,774,071 A | 6/1998 | Konishi et al. | | |
| 7,260,465 B2 * | 8/2007 | Waldis et al. | ................... | 701/96 |
| 7,320,600 B2 * | 1/2008 | Fyke | ................................ | 439/31 |
| 7,327,234 B2 * | 2/2008 | Egami et al. | ................... | 340/429 |
| 7,362,241 B2 * | 4/2008 | Kubota et al. | ............. | 340/995.1 |
| 7,383,127 B2 * | 6/2008 | Matsuo et al. | ................ | 701/211 |
| 7,616,192 B2 * | 11/2009 | Schroeder | ...................... | 345/173 |
| 7,619,505 B2 * | 11/2009 | Kim | ............................ | 340/407.1 |
| 7,924,143 B2 * | 4/2011 | Griffin et al. | ............... | 340/407.2 |
| 2002/0111738 A1 * | 8/2002 | Iwami et al. | .................. | 701/211 |
| 2002/0145512 A1 * | 10/2002 | Sleichter et al. | ........... | 340/407.1 |
| 2007/0109104 A1 * | 5/2007 | Altan et al. | ................ | 340/407.1 |
| 2008/0055055 A1 * | 3/2008 | Powell et al. | .............. | 340/407.1 |
| 2008/0100476 A1 * | 5/2008 | Kim | ............................ | 340/995.2 |

FOREIGN PATENT DOCUMENTS

| | | |
|---|---|---|
| EP | 1 669 720 A1 | 6/2006 |
| JP | A-09-061180 | 3/1997 |
| JP | A-09-133545 | 5/1997 |
| JP | A-09-164858 | 6/1997 |
| JP | A-2000-149191 | 5/2000 |
| JP | A 2000-221051 | 8/2000 |
| JP | A-2002-202147 | 7/2002 |
| JP | A-2005-127937 | 5/2005 |

OTHER PUBLICATIONS

Sep. 15, 2010 European Search Report issued in EP 08 00 9419.
Japanese Patent Office, Notice of Reasons for Rejection mailed Oct. 4, 2011 in Japanese Patent Application No. 2008-063700 w/English-language Translation.

* cited by examiner

*Primary Examiner* — Tuan C. To
(74) *Attorney, Agent, or Firm* — Oliff & Berridge, PLC

(57) ABSTRACT

Navigation devices, methods, and programs obtain information indicating a route of a host vehicle, obtain information indicating a position of the host vehicle, and obtain information indicating a form of a number (N) of successive curves (where N is an integer of 2 or more) in front of the host vehicle position on the route. The devices, methods, and programs excite a vibrator provided at a position where contact with a driver of the host vehicle is possible in a vibration mode corresponding to the form of the N successive curves when the host vehicle reaches a position at a predetermined distance from the closest curve among the N successive curves.

11 Claims, 5 Drawing Sheets

NAVIGATION DEVICES, METHODS, AND PROGRAMS

INCORPORATION BY REFERENCE

The disclosures of Japanese Patent Application No. 2007-146261, filed on May 31, 2007, and Japanese Patent Application No. 2008-063700, filed on Mar. 13, 2008, including the specifications, drawings, and abstracts, are incorporated herein by reference in their entirety.

BACKGROUND

1. Related Technical Fields

Related technical fields include navigation devices, methods, and programs that perform route guidance by transmitting vibrations to a driver.

2. Related Art

Devices that use vibrations to provide information when route guidance is performed by a navigation device or the like are known (see, e.g., Japanese Patent Application Publication No. JP-A-2000-221051).

SUMMARY

Such known devices do not give consideration to cases where a set route involves making successive right and left turns at intersections over a short distance. Namely, with respect to successive intersections, guidance regarding whether to turn right or left at the second and subsequent intersections is not given until the vehicle has passed through the first intersection. As a consequence, the driver cannot prepare in advance for the second and subsequent intersections. Thus, the driver is forced to perform driving operations necessary at the second and/or subsequent intersections in a hurried manner.

Various exemplary implementations of the broad principles described herein provide devices, methods, and programs capable of guiding a driver in advance using a vibration mode of a vibrator with respect to a driving operation for turns and/or curves existing in succession in front of the vehicle.

Exemplary implementations provide devices, methods, and programs that obtain information indicating a route of a host vehicle, obtain information indicating a position of the host vehicle, and obtain information indicating a form of a number (N) of successive curves (where N is an integer of 2 or more) in front of the host vehicle position on the route. The devices, methods, and programs excite a vibrator provided at a position where contact with a driver of the host vehicle is possible in a vibration mode corresponding to the form of the N successive curves when the host vehicle reaches a position at a predetermined distance from the closest curve among the N successive curves.

DETAILED DESCRIPTION OF EXEMPLARY IMPLEMENTATIONS

Figure 1:
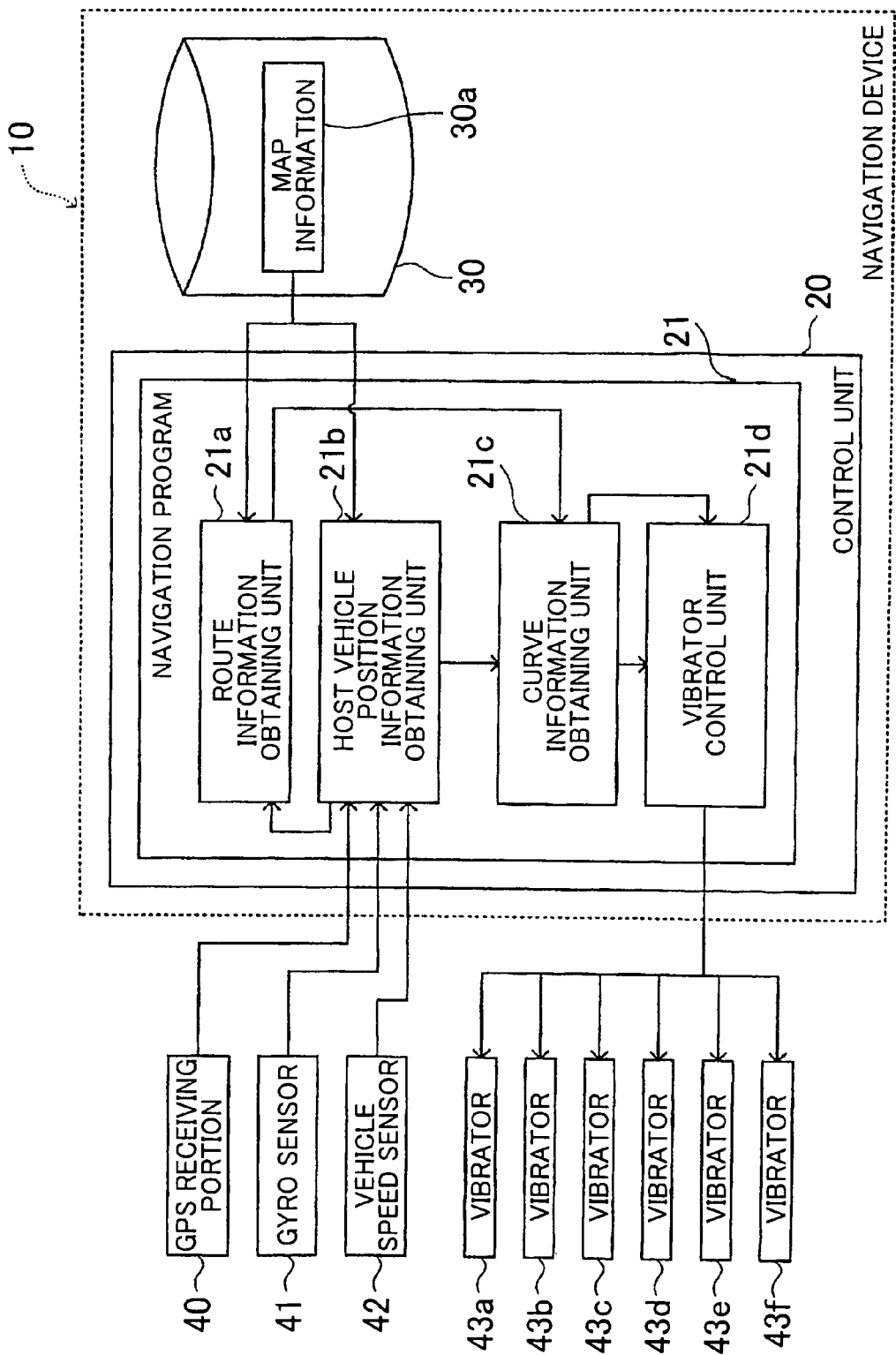
FIG. 1 is a block diagram showing the structure of an exemplary navigation device installed in a vehicle.

FIG. 1 is a block diagram showing the structure of an exemplary navigation device 10. The navigation device 10 includes a controller (e.g., control unit 20), which is a computer equipped with a CPU, a RAM, a ROM, and the like, and a memory 30. A navigation program 21 stored in the memory 30 and/or the ROM is capable of execution by the control unit 20.

A host vehicle (a vehicle installed with the navigation device 10) is provided with a GPS receiving portion 40, a gyro sensor 41, a vehicle speed sensor 42, and vibrators 43a to 43f in order to realize a function for controlling the vibration of the vibrators by the navigation program 21. A function that controls the vibrators to perform route guidance is realized by these portions and the navigation program 21 working in cooperation.

The GPS receiving portion 40 receives radio waves from a GPS satellite and outputs information for calculating a current position of the vehicle via an interface (not shown). The control unit 20 receives a signal therefrom to obtain the current position of the vehicle. The gyro sensor 41 outputs a signal that corresponds to an angular velocity of the vehicle. The control unit 20 obtains this signal via an interface (not shown) to obtain information that indicates a direction in which the vehicle is moving. The vehicle speed sensor 42 outputs a signal that corresponds to a rotational speed of a wheel provided in the vehicle. The control unit 20 obtains this signal via an interface (not shown) to obtain information on the speed of the vehicle.

Figure 2:
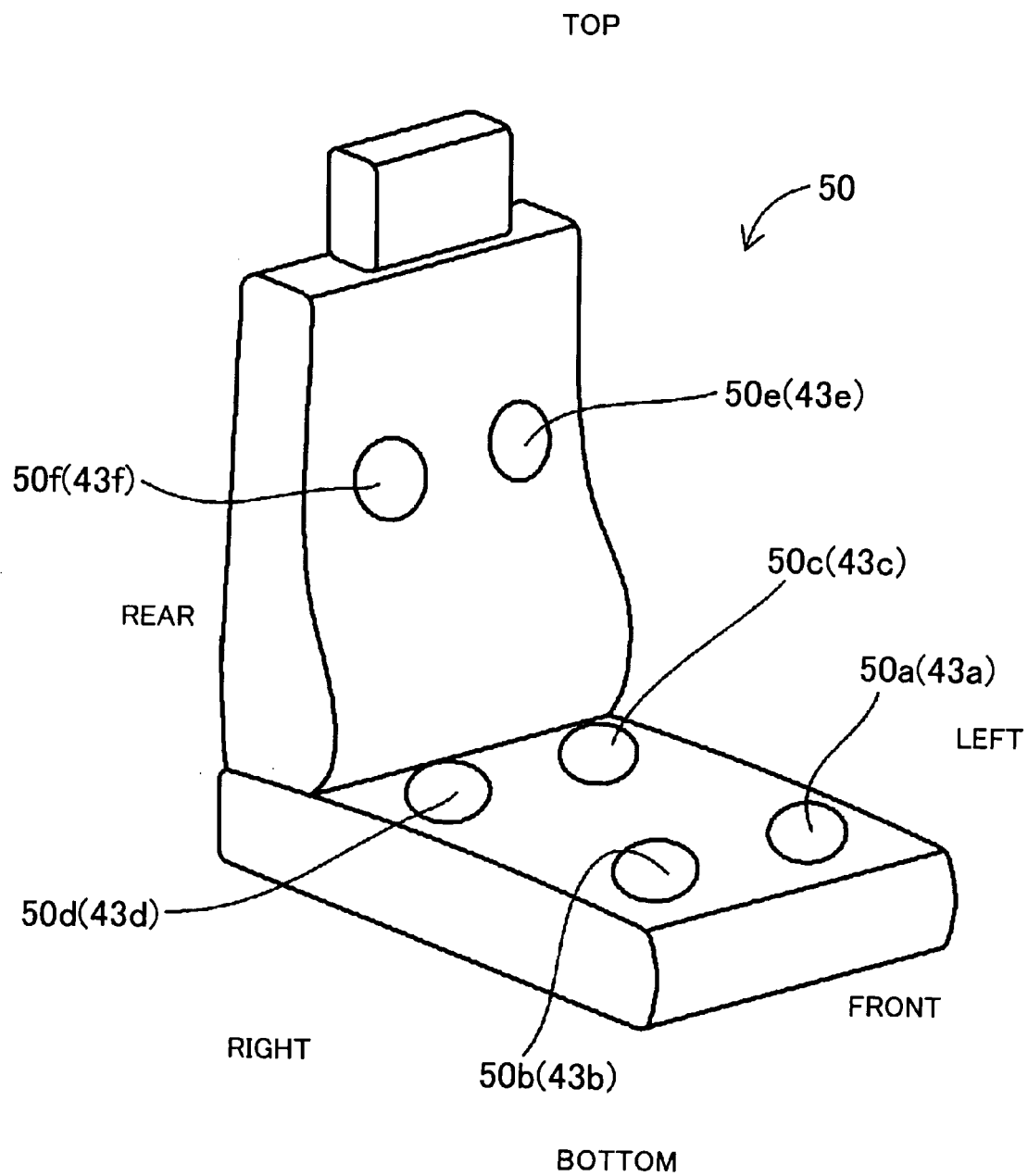
FIG. 2 is a schematic drawing showing an exemplary driver seat.

The vibrators 43a to 43f are vibrators (such as an eccentric motor or the like) that obtain a control signal output by the control unit 20 via an interface (not shown) and are capable of vibrating at a frequency or amplitude of a plurality of patterns as specified by the control signal. The vibrators 43a to 43f are provided at positions where contact with the driver is possible. In the present example, the vibrators 43a to 43f are provided in a seat and capable of contacting the driver when the driver has assumed a driving posture. FIG. 2 is a schematic drawing showing a driver seat 50 according to the present example, and the same FIG. 2 indicates positions where the vibrators are incorporated by circles. Specifically, in the present example, the vibrators 43a to 43f are incorporated with right and left regions 50a, 50b at a front portion of the seat, right and left regions 50c, 50d at a rear portion of the seat, and right and left portions 50e, 50f at an upper portion of the seat back.

Thus, in the present example, the vibrators are provided at positions allowing contact with the right and left anterior thigh regions of the driver, positions allowing contact with the right and left posterior thigh regions of the driver, and positions allowing contact with the right and left shoulders of the driver. Note that since the driver sits in the middle of the seat, the vibrators 43a, 43b provided at the regions 50a, 50b are thus provided at generally symmetrical positions with respect to the center of the driver's body, with the vibrator 43a positioned on the left side as viewed from the center of the driver's body and the vibrator 43b positioned on the right side as viewed from the center of the driver's body.

Similarly, the vibrators 43c, 43d provided at the regions 50c, 50d are provided at generally symmetrical positions with respect to the center of the driver's body, with the vibrator 43c positioned on the left side as viewed from the center of the driver's body and the vibrator 43d positioned on the right side as viewed from the center of the driver's body. Similarly, the vibrators 43e, 43f provided at the regions 50e, 50f are provided at generally symmetrical positions with respect to the center of the driver's body, with the vibrator 43e positioned on the left side as viewed from the center of the driver's body and the vibrator 43f positioned on the right side as viewed from the center of the driver's body.

According to the present example, in order to perform route guidance by working in cooperation with the above-mentioned portions and exciting the vibrators, the navigation program 21 includes a route information obtaining unit 21a, a host vehicle position information obtaining unit 21b, a curve information obtaining unit 21c, and a vibrator control unit 21d. In addition, the memory 30 stores map information 30a for carrying out a route guidance function through the navigation program 21. The map information 30a includes node data indicating nodes set on roads, link data indicating connections between nodes, and data indicating landmark objects. The map information 30a is used for identifying the position of the host vehicle, performing guidance to a destination, and the like. The positions of road curve points, corner points, and intersections are stored as node data.

The route information obtaining unit 21a is a module that, based on the map information 30a and information indicating the position of the host vehicle (hereinafter referred to as "host vehicle position information"), obtains a recommended route from a position of the host vehicle to a destination by performing a search, and outputs information indicating a route for the host vehicle (hereinafter referred to as "route information"). The route information, for example, includes node data indicating nodes set to intersections or the like on roads and link data indicating connections between nodes. It should be noted that if a destination is not set, then a road determined as the road being followed may be used as the route of the host vehicle.

The host vehicle position information obtaining unit 21b is a module that identifies host vehicle position information and outputs the host vehicle position information. Position information is obtained from a signal output by the GPS receiving portion 40, a signal output by the gyro sensor 41, and a signal output by the vehicle speed sensor 42, and the host vehicle position information obtaining unit 21b corrects such information based upon a trajectory on a map employing the map information 30a and identifies the position of the host vehicle. Such position information may also be obtained by vehicle-to-vehicle communication or road-to-vehicle communication.

The curve information obtaining unit 21c is a module that obtains information indicating the form of an N number of successive curves (where, N is an integer of 2 or higher) in front of the host vehicle position on a route. In this specification, a curve refers to a location where the direction of the road and the travel direction of the host vehicle are not straight, such as a curve or corner following the road, or an intersection where a right turn or a left turn is set as part of the route, for example. An N number of successive curves refers to N curves where respective distances between adjacent curves in the order they are passed along a route is equal to or less than a preset distance. Note that the distance between curves may be calculated using a curve end portion and a curve middle portion as origin points, or calculated using reference positions preset for each curve as origin points. The curve information obtaining unit 21c determines whether a plurality of successive curves are present in front of the host vehicle position using the route information and the host vehicle position information, and obtains information indicating the curve forms if curves are present. It should be noted that the curve form includes a distance between curves and the host vehicle, the number of successive curves, a distance between curves, and a direction in which each curve bends (a turning direction at each curve). A degree to which each curve bends or the like may also be included.

The vibrator control unit 21d is a module that corresponds the vibrating mode of the vibrator with the form of the plurality of curves obtained by the curve information obtaining unit 21c, and outputs a signal for exciting the vibrator. The vibrator control unit 21d targets for control one or more vibrators provided at a position allowing contact with the driver of the host vehicle. The vibration mode may be freely set provided that the vibration mode generated enables the driver to instinctually grasp the form of the curve or can be associated through learning with the form of the curve.

Next, an exemplary navigation method utilizing vibrator control will be explained with reference to FIG. 3. The exemplary method may be implemented, for example, by one or more components of the above-described navigation device 10. For example, the method may be implemented in the form of the navigation program 21 that is executed by the navigation device 10, the route information obtaining unit 21a, the host vehicle position information obtaining unit 21b, the curve information obtaining unit 21c, and the vibrator control unit 21d. However, even though the exemplary structure of the above-described navigation device 10 may be referenced in the description, it should be appreciated that the structure is exemplary and the exemplary method need not be limited by any of the above-described exemplary structure.

Before the vibrator control processing is executed, the route information obtaining unit 21a obtains the route information.

Figure 3:
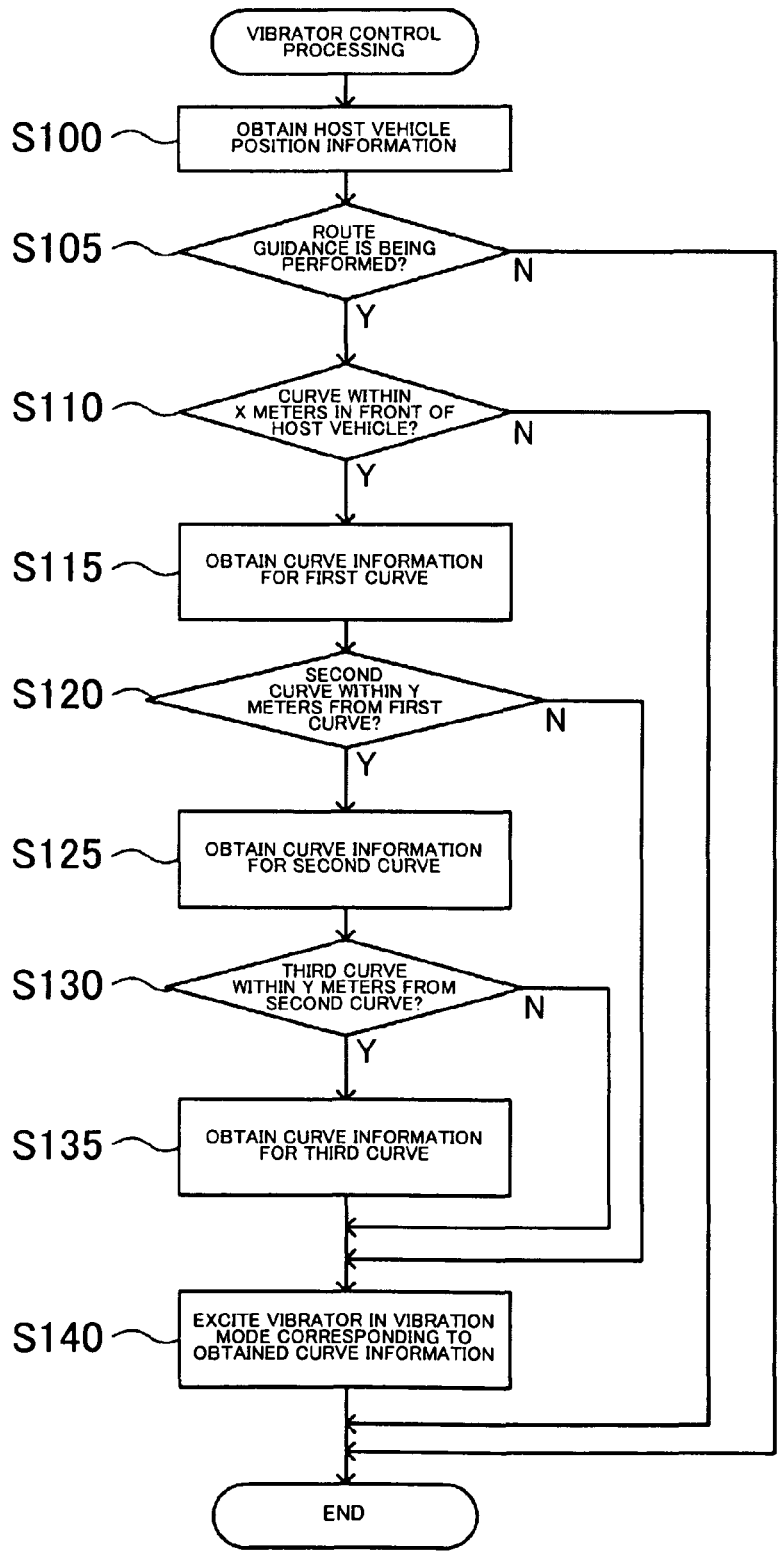
FIG. 3 is a flowchart showing an exemplary navigation method.

As shown in FIG. 3, first, the host vehicle position information obtaining unit 21b obtains the host vehicle position information (step S100). Specifically, position information is obtained from a signal output by the GPS receiving portion 40, a signal output by the gyro sensor 41, and a signal output by the vehicle speed sensor 42, and the host vehicle position information obtaining unit 21b corrects such information based upon a trajectory on a map employing the map information 30a and identifies the position of the host vehicle.

Next, the route information obtaining unit 21a determines whether route guidance is being performed (step S105). In the present example, the destination is set by a user, and it is determined whether route guidance to the destination is being performed. If route guidance is not being performed, then the method is ended. Next, the curve information obtaining unit 21c determines whether a curve exists within X meters (e.g., 500 meters) in front of the host vehicle on the route (step S110).

If there is a curve within X meters, then the curve information obtaining unit 21c obtains curve information for a first curve that is closest when viewed from the host vehicle position (step S115). Specifically, information is obtained that indicates a distance from the host vehicle position to the first curve and a turning direction of the host vehicle at the first curve (e.g., right turning or left turning). If it is determined at step S110 that no curve exists within X meters, then the method is ended.

Next, the curve information obtaining unit 21c determines whether a second curve exists within Y meters (e.g., 200 meters) of the first curve (step S120). If there is a second curve, then the curve information obtaining unit 21c obtains curve information for the second curve (step S125). Specifically, information is obtained that indicates a distance from the first curve to the second curve and a turning direction of the host vehicle at the second curve, for example. If it is determined that no second curve exists, the processing moves to step S140.

Next, the curve information obtaining unit 21c determines whether a third curve exists within Y meters of the second curve (step S130). If there is a third curve, then the curve information obtaining unit 21c obtains curve information for the third curve (step S135). Specifically, information is obtained that indicates a distance from the second curve to the third curve and a turning direction of the host vehicle at the third curve, for example. If it is determined that no third curve exists, the processing moves to step S140. Lastly, the vibrator control unit 21d excites the vibrator in a vibration mode corresponding to the obtained curve information (step S140).

The method is repeatedly executed at a predetermined time interval, and therefore the host vehicle position is updated at the predetermined time interval. According to the present example, if there are two or more successive curves or intersections at which the route guidance requires a right or left turn and the distance between adjacent intersections in the order they are passed along the route is within 200 meters, and when a first upcoming intersection among the successive intersections is within 500 meters of the host vehicle, then the vibrator is controlled in the vibration mode set at step S140. Note that such guidance through vibrating according to the vibration mode set at step S140 may be repeatedly executed until the first intersection is passed through, or executed only once before passing through the first intersection.

Figure 4:
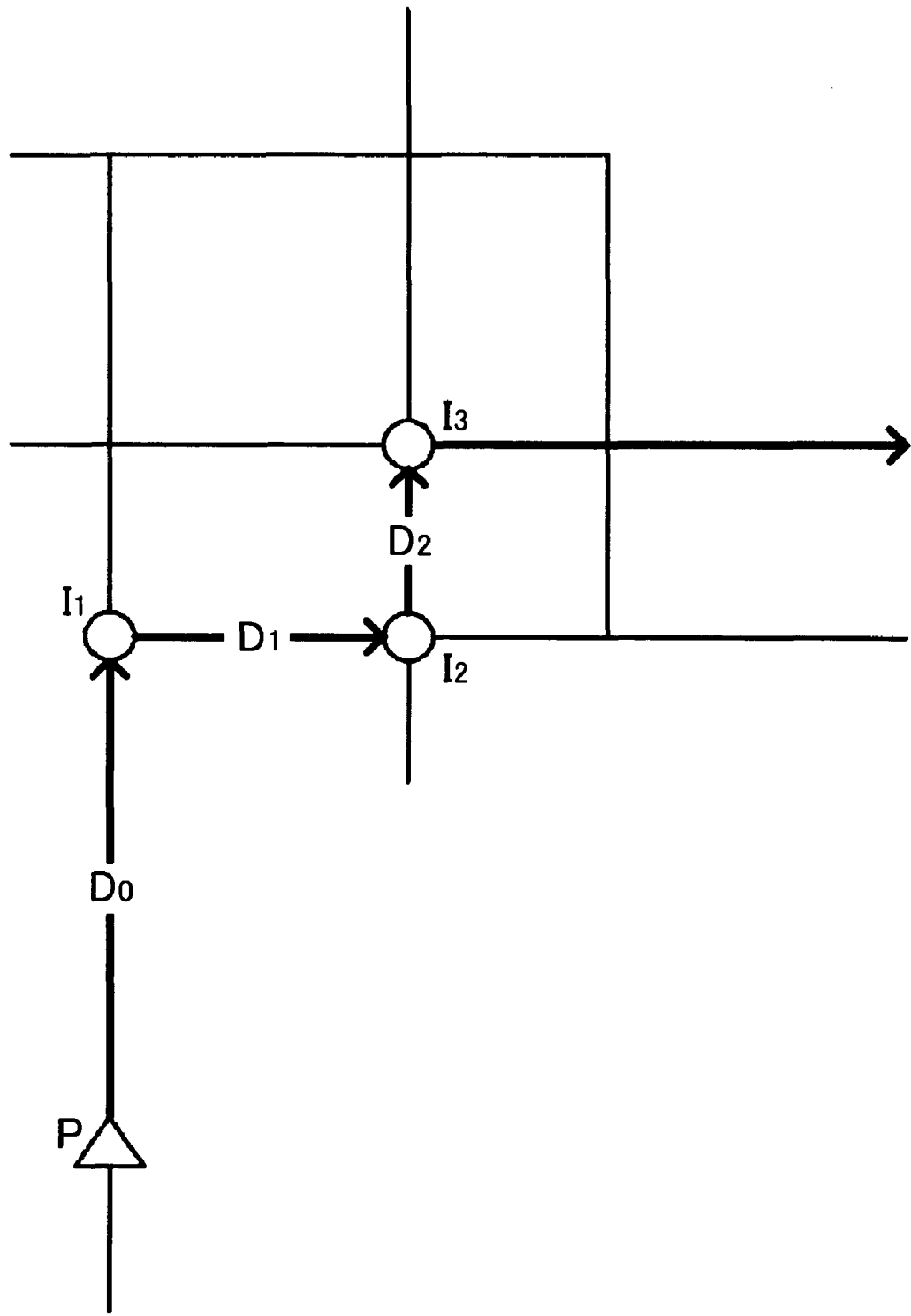
FIG. 4 is a drawing showing an example of an intersection model.

Next, the vibration mode of the vibrator excited at step S140 when the above processing is executed will be described. FIG. 4 is a drawing for explaining an example of operation according to the vibrator control processing, and illustrates a route of the host vehicle. In front of a host vehicle position P along the route, there is a first intersection $I_1$, at a distance $D_0$ ahead, which is an intersection at which a right turn is required, and there is a second intersection $I_2$ at a distance $D_1$ from the intersection $I_1$, which is an intersection at which a left turn is required. There is also a third intersection $I_3$ at a distance $D_2$ from the intersection $I_2$, which is an intersection at which a right turn is required. In the vibration examples described below, the distance $D_0$ is 500 meters, the distance $D_1$ is 200 meters, and the distance $D_2$ is 150 meters.

Figure 5A:
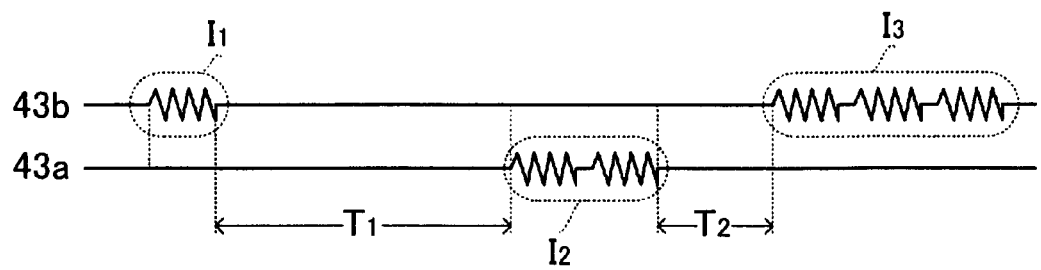
FIGS. 5A-5C shows drawings for explaining examples of vibration modes.

FIG. 5A is a drawing showing one example of a vibration mode in the case where route guidance is performed in accordance with the exemplary method described above. The horizontal axis indicates a time line. The upper side shows a vibration timing for the vibrator 43b on the right side of the seat front portion, and the lower side shows a vibration timing for the vibrator 43a on the left side of the seat front portion. Turning right at the intersections $I_1$, $I_3$ is transmitted to the driver sitting in the driver seat by the vibration of the right-side vibrator, and turning left at the intersection $I_2$ is transmitted by the vibration of the left-side vibrator. Thus, when the driver feels the vibration of the vibrator provided on the right side he or she can instinctively associate such vibration with turning right, and when the driver feels the vibration of the vibrator provided on the left side he or she can instinctively associate such vibration with turning left.

Also, the timings at which vibrations are generated are staggered instead of the vibrations corresponding to each curve being generated at the same time, with the host vehicle position used as a reference and the vibrations generated in order starting with the vibration corresponding to the closest intersection. Thus, using the host vehicle position as a reference, the driver can instinctually associate the intersection corresponding to the second felt vibration as being farther away than the intersection corresponding to the first felt vibration along the route. Moreover, the intersection corresponding to the third felt vibration can be associated with being even farther away.

In addition, an interval (a time $T_1$) between the vibration corresponding to the intersection $I_1$ and the vibration corresponding to the intersection $I_2$, as well as an interval (a time $T_2$) between the vibration corresponding to the intersection $T_2$ and the vibration corresponding to the intersection $T_3$, can be respectively corresponded to the distance $D_1$ and the distance $D_2$. Thus, the driver can instinctually associate the lengths of the distances between the curves. In order to indicate that the distance $D_1$ is longer than the distance $D_2$, the time $T_1$ at least is set longer than the time $T_2$.

Guidance for an $M^{th}$ (where, M is an integer equal to or greater than 1 and equal to or less than N−1) curve near the host vehicle position can be performed by generating a preset unit of vibration M times. For example, the driver can easily associate a unit of vibration generated twice as being a vibration corresponding to the second intersection from the host vehicle position. It should be noted that for the unit of vibration, the vibration mode is not limited provided that it is a vibration within a preset unit of time. In other words, provided that a specific vibration is generated within a specific period and is countable, the vibration may be continuous or discrete. The number of vibrations and the level of vibration may also be arbitrarily set.

Figure 5B:
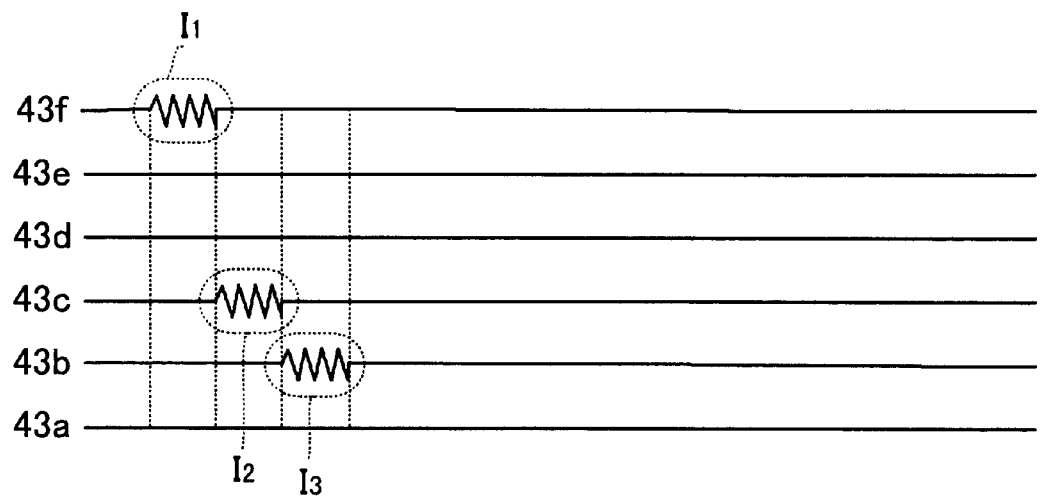

FIG. 5B is a drawing showing another example of a vibration mode in the case where route guidance is performed in accordance with the exemplary method described above. Descriptions that overlap with the above vibration mode example are omitted, and only features unique to the present example are explained. FIG. 5B shows the vibration timing for six vibrators, namely, in order from top to bottom, the vibrator 43f on the right side of the seat back upper portion, the vibrator 43e on the left side of the seat back upper portion, the vibrator 43d on the right side of the seat rear portion, the vibrator 43c on the left side of the seat rear portion, the vibrator 43b on the right side of the seat front portion, and the vibrator 43a on the left side of the seat front portion.

As FIG. 5B shows, using the host vehicle position as a reference, guidance for the first upcoming intersection $I_1$ (i.e., the intersection closest to the host vehicle) is performed by vibrating the vibrator 43f on the right side of the seat back upper portion; guidance for the second intersection $I_2$ is performed by vibrating the vibrator 43c on the left side of the seat rear portion; and guidance for the third intersection $I_3$ is performed by vibrating the vibrator 43b on the right side of the seat front portion. These assume a position of the driver seat (e.g. a headrest) at which contact with the driver's head is possible when the driver sits in the driver seat as a reference position, wherein the vibrators 43e, 43f provided closest to the reference position are corresponded with the first intersection, the vibrators 43c, 43d provided second closest to the reference position are corresponded with the second intersection, and the vibrators 43a, 43b provided third closest to the reference position are corresponded with the third intersection. Moreover, a vibrator on the right side vibrates in the case of a right turn, and a vibrator on the left side vibrates in the case of a left turn.

Thus, a vibrator provided closer to the driver's head when the driver sits in the driver seat corresponds to an intersection closer to the host vehicle position, while a vibrator provided farther from the driver's head corresponds to an intersection farther from the host vehicle position. As a consequence, the driver can recognize that the vibrating of a vibrator close to his or her head corresponds to an intersection close to the host vehicle position.

Figure 5C:
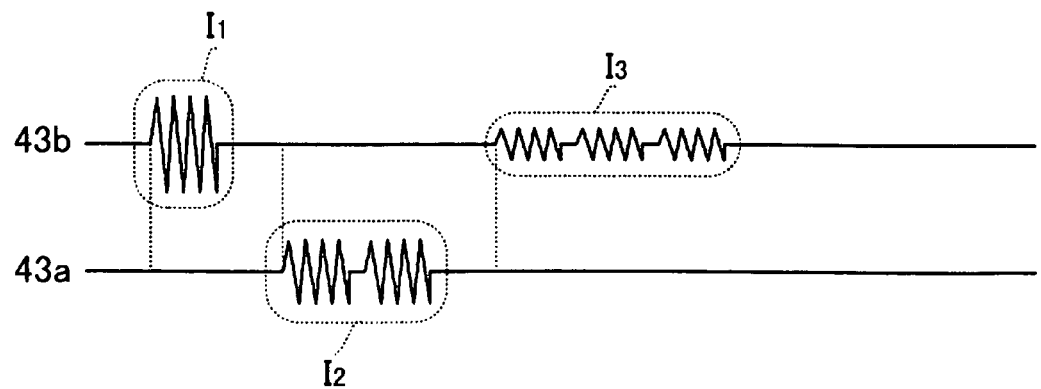

FIG. 5C is a drawing showing another example of a vibration mode. For simplicity, descriptions that overlap with the above vibration mode examples are omitted, and only features unique to the present example will be explained. In this example, using the host vehicle on the route as a reference, vibrations corresponding to intersections at positions closer to the host vehicle are stronger, while vibrations corresponding to intersections at positions farther away are weaker. FIG. 5C shows that the vibration corresponding to the intersection $I_1$ is strongest, while the vibration corresponding to the intersection $I_3$ is weakest. Thus, the driver can instinctually associate that the intersection corresponding to the strong vibration is closer to the host vehicle on the route than the intersection corresponding to the weak vibration. Note that a strong vibration refers to a vibration with a large frequency or a vibration with a large amplitude, for example.

As explained above, according to the present examples, the driver can recognize that there is a plurality of successive intersections in front of the host vehicle before encountering the plurality of intersections. In addition, the driver can intuit an intersection model based on the vibration mode. As a consequence, based on the intersection model, the driver can intuit a driving operation to be performed when traveling through the intersection.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles providing that information is obtained that indicates a plurality of successive curve forms in front of a host vehicle position along a route, and vibration modes corresponding to the plurality of curve forms are used to vibrate a vibrator provided at a position where contact with the driver of the host vehicle is possible.

For example, provided that the positions of the N curves with respect to the host vehicle position are corresponded to the positions of the vibrators with respect to a reference position of a seat in which the driver is sitting, the quantity and layout of the vibrators, and how the positions correspond are not particularly limited. For example, vibrators provided closer to the driver's head may correspond to curves farther away from the host vehicle.

It should also be noted that in cases where separate vibrators respectively correspond to intersections as in the second vibration mode example, the vibrators may be simultaneously excited instead of providing a time lag between the vibrations corresponding to the intersections. Regardless of whether a plurality of vibrators are simultaneously excited, separate vibrators are respectively vibrating. Therefore, the driver can still associate the order and distance to the intersection with the position of the excited vibrator.

Furthermore, in the above example, a structure was described where a plurality of vibrators is used to perform route guidance. However, only one vibrator may be used. In such case, guidance may be performed for only N curves present ahead of the host vehicle on the route by repeating a unit of vibration M times in an order starting from an $M^{th}$ unit of vibration. In other words, the structure may omit guidance for information regarding whether to turn left or right.

Further, the vibrator(s) may be provided in the steering wheel, for example, wherein the right side of the steering wheel vibrates in the case of a right turn and the left side of the steering wheel vibrates in the case of a left turn, as shown in FIGS. 5A and 5C.

In addition, information indicating the route of the host vehicle is not limited to a recommended route obtained as a result of a search, as described in the above example, provided that such information indicates a route on which the host vehicle is highly likely to travel. Information indicating a planned travel route manually set by the driver may be used, as well as information indicating an estimated route obtained by learning processing based on a past traveled route.

In the above example, a structure was described in which guidance for up to a maximum of three successive intersections was performed in advance. However, the number of intersections for which guidance is performed in advance by vibration may be a maximum of two intersections, or four or more intersections.

What is claimed is:

1. A navigation device, comprising:
a controller that:
obtains information indicating a route of a host vehicle;
obtains information indicating a position of the host vehicle;
obtains information indicating a form of a number (N) of successive curves (where N is an integer of 2 or more) in front of the host vehicle position on the route;
excites a vibrator provided at a position where contact with a driver of the host vehicle is possible in a vibration mode corresponding to the form of the N successive curves when the host vehicle reaches a position at a predetermined distance from the closest curve among the N successive curves;
the controller generates a vibration corresponding to an $M^{th}$ (where M is an integer equal to or greater than 1 and equal to or less than N−1) curve near the host vehicle position on the route before generating a vibration corresponding to an $(M+1)^{th}$ curve; and
the controller lengthens an interval between the vibration corresponding to the $M^{th}$ curve and the vibration corresponding to the $(M+1)^{th}$ curve in accordance with a longer distance between the $M^{th}$ curve and the $(M+1)^{th}$ curve.

2. The navigation device according to claim 1, wherein:
the vibration corresponding to the $M^{th}$ curve is a stronger vibration than the vibration corresponding to the $(M+1)^{th}$ curve.

3. The navigation device according claim 1, wherein:
the controller performs guidance for the $M^{th}$ curve by generating a preset unit of vibration M times.

4. The navigation device according to claim 1, wherein:
the controller excites a vibrator provided on a right side of the driver when performing guidance for a right curve among the N successive curves, and excites a vibrator provided on a left side of the driver when performing guidance for a left curve among the N successive curves.

5. The navigation device according to claim 1, wherein:
the controller selects N vibrators corresponding to positions of the N successive curves with respect to the host vehicle position and excites the selected vibrators.

6. A navigation method, comprising:
obtaining information indicating a route of a host vehicle;
obtaining information indicating a position of the host vehicle;
obtaining information indicating a form of a number (N) of successive curves (where N is an integer of 2 or more) in front of the host vehicle position on the route;
exciting a vibrator provided at a position where contact with a driver of the host vehicle is possible in a vibration mode corresponding to the form of the N successive curves when the host vehicle reaches a position at a predetermined distance from the closest curve among the N successive curves;
generating a vibration corresponding to an $M^{th}$ (where M is an integer equal to or greater than 1 and equal to or less than N−1) curve near the host vehicle position on the route before generating a vibration corresponding to an $(M+1)^{th}$ curve; and lengthening an interval between the vibration corresponding to the $M^{th}$ curve and the vibration corresponding to the $(M+1)^{th}$ curve in accordance with a longer distance between the $M^{th}$ curve and the $(M+1)^{th}$ curve.

7. The navigation method according to claim 6, wherein:
the vibration corresponding to the $M^{th}$ curve is a stronger vibration than the vibration corresponding to the $(M+1)^{th}$ curve.

8. The navigation method according to claim 6, further comprising:
performing guidance for the $M^{th}$ curve by generating a preset unit of vibration M times.

9. The navigation method according to claim 6, further comprising:
exciting a vibrator provided on a right side of the driver when performing guidance for a right curve among the N successive curves; and
exciting a vibrator provided on a left side of the driver when performing guidance for a left curve among the N successive curves.

10. The navigation method according to claim 6, further comprising:
selecting N vibrators corresponding to positions of the N successive curves with respect to the host vehicle position and excites the selected vibrators.

11. A computer-readable storage medium storing a computer-executable program usable to provide navigation, the program comprising:
instructions for obtaining information indicating a route of a host vehicle;
instructions for obtaining information indicating a position of the host vehicle;
instructions for obtaining information indicating a form of an number (N) of successive curves (where N is an integer of 2 or more) in front of the host vehicle position on the route;
instructions for exciting a vibrator provided at a position where contact with a driver of the host vehicle is possible in a vibration mode corresponding to the form of the N successive curves when the host vehicle reaches a position at a predetermined distance from the closest curve among the N successive curves
instructions for generating a vibration corresponding to an $M^{th}$ (where M is an integer equal to or greater than 1 and equal to or less than N−1) curve near the host vehicle position on the route before generating a vibration corresponding to an $(M+1)^{th}$ curve; and
instructions for lengthening an interval between the vibration corresponding to the $M^{th}$ curve and the vibration corresponding to the $(M+1)^{th}$ curve in accordance with a longer distance between the $M^{th}$ curve and the $(M+1)^{th}$ curve.

* * * * *